United States Patent
Sugano et al.

(10) Patent No.: US 9,169,356 B2
(45) Date of Patent: Oct. 27, 2015

(54) CYANATE ESTER POLYMER

(75) Inventors: Yuuichi Sugano, Niigata (JP);
Masayuki Katagiri, Niigata (JP);
Daisuke Ohno, Saitama (JP); Tomoaki Kubota, Niigata (JP); Yoshikazu Shima, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 1719 days.

(21) Appl. No.: 12/091,350

(22) PCT Filed: Sep. 26, 2006

(86) PCT No.: PCT/JP2006/319042
§ 371 (c)(1),
(2), (4) Date: Apr. 24, 2008

(87) PCT Pub. No.: WO2007/049422
PCT Pub. Date: May 3, 2007

(65) Prior Publication Data
US 2009/0130488 A1    May 21, 2009

(30) Foreign Application Priority Data
Oct. 25, 2005 (JP) ................. 2005-309588

(51) Int. Cl.
C08G 73/06 (2006.01)
C08J 5/24 (2006.01)

(52) U.S. Cl.
CPC .............. C08G 73/0655 (2013.01); C08J 5/24 (2013.01); *C08J 2379/04* (2013.01)

(58) Field of Classification Search
CPC ...... C08G 73/0655; C08J 5/24; C08J 2379/04
USPC .......... 528/86, 93, 98, 99, 119, 120, 363, 422
See application file for complete search history.

(56) References Cited

U.S. PATENT DOCUMENTS

| | | | |
|---|---|---|---|
| 4,745,215 A | 5/1988 | Cox et al. | |
| 5,186,880 A | 2/1993 | Gaku et al. | |
| 5,360,887 A * | 11/1994 | Tsunemi et al. | 528/97 |
| 5,367,083 A * | 11/1994 | Sheppard et al. | 548/431 |
| 5,488,144 A * | 1/1996 | Tsunemi et al. | 560/301 |
| 5,550,282 A * | 8/1996 | Tsunemi et al. | 560/301 |
| 6,660,811 B2 * | 12/2003 | Ogura et al. | 525/523 |
| 6,931,050 B1 | 8/2005 | Bottomley | |
| 2002/0156189 A1 | 10/2002 | Ogura et al. | |
| 2006/0084787 A1 | 4/2006 | Sugano et al. | |
| 2008/0200636 A1* | 8/2008 | Nakanishi et al. | 528/105 |

FOREIGN PATENT DOCUMENTS

| | | |
|---|---|---|
| EP | 0 285 849 A2 | 10/1988 |
| EP | 0 604 823 A1 | 7/1994 |
| EP | 0 407 176 | 11/1994 |
| EP | 1 566 377 | 8/2005 |
| JP | 63-250359 | 10/1988 |
| JP | 01-299834 | 12/1989 |
| JP | 02-286723 | 11/1990 |
| JP | 04-024370 | 4/1992 |
| JP | 06-049238 | 2/1994 |
| JP | 06-122763 | 5/1994 |
| JP | 06-228308 | 8/1994 |
| JP | 07-207022 | 8/1995 |
| JP | 2000-001524 | 1/2000 |
| JP | 2000-095938 | 4/2000 |
| JP | 2002-206048 | 7/2002 |
| JP | 2002-531989 | 9/2002 |
| JP | 2003-128753 | 5/2003 |
| JP | 2003-128784 | 5/2003 |
| JP | 2003-128928 | 5/2003 |
| JP | 2004-026984 | 1/2004 |
| JP | 2005-187335 | 7/2005 |
| WO | WO 00/33472 | 6/2000 |
| WO | WO 2006090662 A1 * | 8/2006 ............. C08G 59/32 |

OTHER PUBLICATIONS

European Search Report dated Jun. 18, 2010, for EP 06 81 0567.

* cited by examiner

*Primary Examiner* — Callie Shosho
*Assistant Examiner* — John Freeman
(74) *Attorney, Agent, or Firm* — Greenblum & Bernstein, P.L.C.

(57) ABSTRACT

Provided is a cyanate ester polymer having excellent flame retardance, low dielectric constant, low dielectric loss tangent and high heat resistance. Specifically provided is a cyanate ester polymer obtained by polymerizing a cyanate ester compound represented by the following general formula (1). (1) In the formula, X represents OCN or OH, and 10-100% by mol of X is composed of OCN.

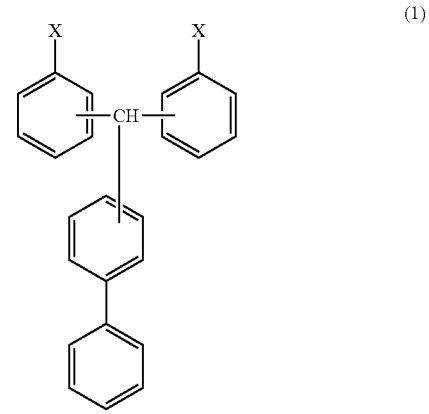

(1)

7 Claims, No Drawings

CYANATE ESTER POLYMER

TECHNICAL FIELD

The present invention relates to a cyanate ester polymer obtained by polymerizing a cyanate ester compound. The cyanate ester compound to be used in the present invention has low volatility and good solubility in solvent, and by polymerizing it, a polymer material excellent in flame retardance, heat resistance and low dielectric characteristics may be obtained. The cyanate ester polymer obtained by polymerizing the cyanate ester compound may be used in broad applications for electric insulating materials, resist resins, semiconductor sealing resins, adhesives for printed circuit boards, matrix resins for laminates in electric fields and prepregs, built-up laminate materials, resins for fiber-reinforced plastics, sealing resins for liquid-crystal display panels, color filter resins for liquid crystals, paints, various coating agents, adhesives, etc.

BACKGROUND ART

A cyanate ester polymer has a triazine ring formed by polymerization; and owing to its high heat resistance and excellent electric characteristics, the polymer is heretofore widely used as raw materials for various functional polymer materials such as structural composite materials, adhesives, electric insulating materials, electric/electronic parts, etc. However, with the recent requirement for advanced high-level performance in the field of these applications, the requirement for the properties of functional polymer materials has become severer and severer. The properties include, for example, flame retardance, heat resistance, low dielectric constant, low dielectric loss tangent, weather resistance, chemical resistance, low water absorbability, high fracture toughness, etc., but up to the present, these required properties are not always satisfied.

For example, in the field of printed circuit board materials, the materials are required to have a low dielectric constant and a low dielectric loss tangent with the current tendency toward higher frequency for communication frequency and clock frequency, and cyanate resins having excellent dielectric characteristics have become much used. In that situation, from the viewpoint of security of safety against fire, flame retardance must be imparted to them, and bromine compounds having high flame retardance are used. For example, known are bromobisphenol A (see Patent Reference 1), bromophenol-novolak glycidyl ether (see Patent Reference 2), bromomaleimides (see Patent Reference 3), halogen-having monofunctional cyanates (see Patent Reference 4), addition-type bromine compounds having no reactivity with cyanate ester compound (see Patent Reference 5). These bromine compounds have high flame retardance, but may have a risk of generating corrosive bromine or hydrogen bromide through thermal decomposition, and therefore, materials not containing a bromine-based flame retardant are desired.

Accordingly, phosphorus-containing compounds and nitrogen/sulfur-containing compounds are investigated as a flame retardance substitutable for bromine-based flame retardant. For example, as a phosphorus compound often incorporated in epoxy resin, investigated are triphenyl phosphate and resorcinol bis(diphenyl phosphate). However, when incorporated in large quantities, they often lower heat resistance, moisture resistance, water absorbability, etc. For overcoming it, known is a method of adding a phenolic hydroxyl group-having phosphorus compound to a cyanate compound (for example, see Patent References 6, 7, and 8); but the phosphorus compound is also problematic in point of its toxicity. As a nitrogen compound, used are melamine, guanidine, etc.; but when used alone, their flame retardance is insufficient.

On the other hand, a metal hydroxide such as aluminium hydroxide, magnesium hydroxide or the like may be mentioned as a flame retardant; but incorporation of a metal hydroxide may have a risk of lowering dielectric characteristics, heat resistance, impact resistance and moldability. In addition, for example, as in epoxy resin, use of a large amount of an inorganic filler such as spherical fused silica for reducing flammables and for securing flame retardance may take a risk of increasing the melt viscosity of molding materials, thereby lowering the moldability and the substrate wettability thereof to lower the adhesive power, and worsening the dielectric characteristics thereof.

Further, even an antimony-type flame retardant such as antimony trioxide, which is widely used as combined with a bromoepoxy resin, is also problematic in that it is a deleterious substance and therefore has a risk of chronic toxicity. From the above viewpoints, flame retardance of thermosetting resin itself is more desired than before.

For improving heat resistance, low dielectric constant, low dielectric loss tangent, weather resistance, chemical resistance, low water absorbability, high fracture toughness, moldability, adhesiveness and others simultaneously with flame retardance, many trials have heretofore been made. For example, disclosed are a method of producing a cured product having excellent thermal stability by combining a monocyanate and a dicyanate (see Patent Reference 9); and a method of attaining a low dielectric constant and a low dielectric loss tangent by combining a monofunctional cyanate ester compound and a polyfunctional cyanate ester compound (see Patent Reference 10).

Also described is a method of producing a poorly moisture-absorptive, flame-retardant cyanate ester-containing curable resin composition by adding a halogen-containing monofunctional cyanate ester thereto so as to lower the dielectric constant and the dielectric loss tangent of the composition (see Patent Reference 4). The patent reference describes cyanate esters in a broad range, but for keeping their flame retardance, an aromatic monofunctional cyanate ester having bromine as a functional group is an indispensable component, and no one could succeed in improving the flame retardance by the use of a cyanate ester resin alone. As described in the above, these bromine compounds may have a risk of generating corrosive bromine or hydrogen bromide through thermal decomposition.

Also provided are an aromatic cyanate ester compound having at least two rings bonding to each other via an unsaturated group-containing group (see Patent Reference 11), a fluorine-containing dicyanate ester (see Patent Reference 12), a method of using a phenol-novolak-type cyanate ester for attaining flame retardance (see Patent Reference 13), etc. In any case, however, an example of satisfying all of practicable low dielectric characteristics, flame retardance and heat resistance by the use of a cured product of a cyanate ester compound alone is not known.

In case where a cyanate ester is used in laminates for printed circuit boards, first it is dissolved in a solvent such as methyl ethyl ketone to prepare a varnish, and then this is impregnated into a glass cloth and dried to give a prepreg. When the steps are taken into consideration, the solubility of cyanate ester in solvent and the low volatility and the stability thereof in the working process are also important factors.

Patent Reference 1: JP-B 4-24370
Patent Reference 2: JP-A 2-286723

Patent Reference 3: JP-A 7-207022
Patent Reference 4: JP-A 6-122763
Patent Reference 5: JP-A 2000-95938
Patent Reference 6: JP-A 2003-128928
Patent Reference 7: JP-A 2003-128753
Patent Reference 8: JP-A 2003-128784
Patent Reference 9: JP-A 6-228308
Patent Reference 10: JP-A 6-49238
Patent Reference 11: JP-T 2002-531989
Patent Reference 12: JP-A 63-250359
Patent Reference 13: JP-A 2002-206048

DISCLOSURE OF THE INVENTION

Problems to be Solved by the Invention

An object of the present invention is to solve the above-mentioned problems and to provide a cyanate ester polymer having excellent flame retardance, low dielectric constant, low dielectric loss tangent and high heat resistance.

Means for Solving the Problems

The present inventors have assiduously studied and, as a result, have found that a cyanate ester compound represented by a general formula (1) has good solubility in solvent, and when polymerized (cured), it gives a cyanate ester polymer having flame retardance, high heat resistance and low dielectric characteristics, and have completed the present invention. Specifically, the present invention provides a cyanate ester polymer obtained by polymerizing a cyanate ester compound represented by a general formula (1):
[Chemical Formula 1]

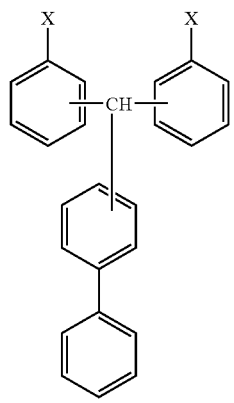

(1)

(In the formula, X represents OCN or OH, and from 10 to 100% by mol of X is OCN)

The present invention also provides a prepreg formed by impregnating a substrate with a cyanate ester compound represented by the general formula (1); and a laminate produced by laminating a plurality of those prepregs and integrally shaping them under heat and compression.

Effect by the Invention

The cyanate ester polymer of the present invention has excellent flame retardance, low dielectric constant, low dielectric loss tangent and high heat resistance, and is therefore extremely useful as a high-functional polymer material; and as a thermally and electrically excellent material, it may be used in broad applications for electric insulating materials, adhesives, laminate materials, resists, built-up laminate materials, etc.

BEST MODE FOR CARRYING OUT THE INVENTION

The present invention is described in detail hereinafter. In the cyanate ester compound represented by the general formula (1), X is OCN or OH, and from 10 to 100% by mol of X is OCN. For sufficient polymerization (curing) of the compound to give a cyanate ester polymer, or that is, for sufficient triazine ring formation, it is desirable that at least 80% by mol of X is OCN.

The method for producing the compound represented by the general formula (1) is not specifically defined. The compound may be produced in any method now existing for cyanate synthesis. For example, LAN HAMERTON, "Chemistry and Technology of Cyanate Ester Resins", BLACKIE ACADEMIC & PROFESSIONAL describes a general method for synthesis of cyanate compounds. U.S. Pat. No. 3,553,244 provides a method of reacting a cyan halide in the presence of a base in a solvent under such a condition that the cyan halide all the time exists excessively over the base. Japanese Patent 3425023 describes a method of reacting a cyan halide with a basic phenol resin salt in a cyclic ether solvent and isolating and purifying the product at a temperature not higher than 0° C. JP-A 7-53497 discloses a synthetic method of using a tertiary amine as a base and using it excessively over cyan chloride: JP-T 2000-501138 discloses a method of reacting a trialkylamine and a cyan halide in a continuous plug flow system: JP-T 2001-504835 discloses a method of reacting a phenol and a cyan halide in the presence of a tert-amine in a non-aqueous solution with processing the by-product, tert-ammonium halide with an anion/cation exchange pair. Japanese Patent 2991054 describes a method of reacting a tertiary amine and a cyan halide through simultaneous addition in the presence of a solvent capable of separating a phenol compound from water in a mode of liquid-liquid separation, then washing it with water and subjecting it to liquid-liquid separation, followed by precipitation and purification from the obtained solution by the use of a bad solvent such as a secondary or tertiary alcohol and hydrocarbon.

The compound represented by the general formula (1) may be obtained, for example, by reacting a phenol compound represented by a general formula (2) and cyan chloride in a solvent in the presence of a basic compound. Also employable is a method of forming a salt of the same phenol compound represented by the general formula (2) and a basic compound, in a water-containing solution, and thereafter reacting it with cyan chloride in a mode of two-phase interfacial reaction to produce the intended compound.
[Chemical Formula 2]

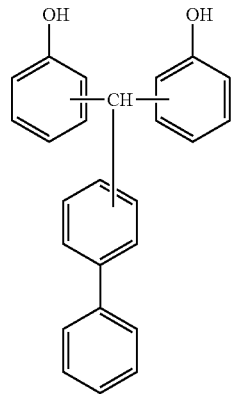

(2)

Herein, the compound represented by the general formula (2) may be obtained, for example, according to the method described in JP-A 2003-34711. Specifically, there is mentioned a method of reacting biphenylaldehyde with a phenol compound with using an acidic catalyst.

In general, a synthetic process for a cyanate ester comprises dissolving a phenol compound of the general formula (2) in an organic solvent, adding a basic compound such as a tertiary amine thereto, and then reacting it with an excessive cyan halide. In this process, a cyan halide all the time exists excessively, and therefore it is said that production of an imide carbonate could be prevented from being formed through reaction of a phenolate anion and a cyanate ester. However, since the excessive cyan halide reacts with a tertiary amine to form a dialkyl cyanamide, the reaction temperature must be kept not higher than 10° C., preferably not higher than 0° C., more preferably not higher than −10° C.

Apart from the above-mentioned methods, the supplying order of reactants in the reaction may be suitably determined in any desired manner. For example, a phenol compound may be dissolved in a solvent, and then a basic compound such as a tertiary amine and a cyan halide or its solution may be alternately dropwise added thereto, or they may be supplied at the same time. In addition, a mixed solution of a phenol compound and a basic compound such as a tertiary amine, and a cyan halide or its solution may be supplied at the same time. In any case, the reaction is a great exothermic reaction; and for the purpose of inhibiting side reaction, the reaction temperature must be kept not higher than 10° C., preferably not higher than 0° C., more preferably not higher than −10° C.

The reaction mode may be any desired one; the reaction may be a batch reaction or a semi-batch reaction, or may be a continuous flow reaction.

The basic compound such as tertiary amine and the cyan halide are added in an amount of from 0.1 to 8 molar times, preferably from 1 to 3 molar times relative to the phenolic hydroxyl group in the phenol compound, and reacted with it. In particular, when the phenol compound has a substituent with steric hindrance, at the ortho-position to the hydroxyl group, the necessary amount of the basic compound such as tertiary amine and the cyan halide increases, as compared with a case not having the substituent.

As the above-mentioned cyan halide, usable are cyan chloride, cyan bromide, etc.

The basic compound may be any of organic or inorganic bases; however when an organic solvent is used, preferred is an organic base having a high solubility therein. Above all, preferred is a tertiary amine having little side reaction. The tertiary amine may be any of alkylamines, arylamines and cycloalkylamines, specifically including trimethylamine, triethylamine, methyldiethylamine, tripropylamine, tributylamine, methyldibutylamine, dinonylmethylamine, dimethylstearylamine, dimethylcyclohexylamine, diethylaniline, pyridine, quinoline.

The solvent to be used in the reaction may be a ketone solvent such as acetone, methyl ethyl ketone, methyl isobutyl ketone; an aromatic solvent such as benzene, toluene, xylene; an ether solvent such as diethyl ether, dimethyl cellosolve, diglyme, tetrahydrofuran, methyltetrahydrofuran, dioxane, tetraethylene glycol dimethyl ether; a halogenohydrocarbon solvent such as methylene chloride, chloroform, carbon tetrachloride, chlorobenzene; an alcohol solvent such as methanol, ethanol, isopropanol, methyl cellosolve, propylene glycol monomethyl ether; an aprotic polar solvent such as N,N-dimethylformamide, N-methylpyrrolidone, 1,3-dimethyl-2-imidazolidone, dimethyl sulfoxide; a nitrile solvent such as acetonitrile, benzonitrile; a nitro solvent such as nitromethane, nitrobenzene; an ester solvent such as ethyl acetate, ethyl benzoate; a hydrocarbon solvent such as cyclohexane, and any of these may be used herein. One or more of these may be combined, depending on the reaction substrate.

As the post-treatment after the reaction, in general, the by-product, hydrochloride of the basic compound such as tertiary amine is removed by filtration, or removed by washing with water. Washing with water is taken into consideration, and it is desirable that a solvent immiscible with water is used in the reaction. Employable is a method of using an aqueous acid solution such as dilute hydrochloric acid for the purpose of removing the excessive amines in the washing step. For removing water from the well-washed reaction liquid, a general method may be employed for drying operation with sodium sulfate, magnesium sulfate, etc.

After the operation, the system is processed for concentration, precipitation or crystallization. For concentration, employable is a method under reduced pressure and under control at 150° C. or lower, since the cyanate ester compound has an unstable structure. For precipitation, usable is a solvent having a low solubility; and for example, employable is a method of dropwise adding an ether solvent, a hydrocarbon solvent such as hexane, or an alcohol solvent to the reaction solution, and vice versa.

For washing the obtained crude product, employable is a method of washing a concentrate of the reaction liquid with an ether solvent, a hydrocarbon solvent such as hexane, or an alcohol solvent. For crystallization, the reaction liquid may be simply concentrated or cooled. From the thus-obtained product, the volatile is removed according to a method of drying under reduced pressure, whereby a cyanate ester compound having a high purity can be obtained.

In general, a cyanate ester compound having a biphenyl structure has a low solubility in solvent, especially having a low solubility in a ketone solvent such as methyl ethyl ketone. However, the cyanate ester compound to be used in the present invention has an asymmetric structure, and has a high solubility in the solvent, therefore facilitating a series of operation of forming a cured product from a varnish material. In addition, the compound may be readily mixed with any other compound, and is therefore useful for various applications such as laminate materials.

It is known that a cured product having a biphenyl structure has thermal stability and flame retardance based on its foaming and heat-insulating effect. The cyanate ester polymer of the present invention has a biphenyl structure in the skeleton thereof, and therefore exhibits excellent flame retardance.

In the present invention, a cyanate ester compound of formula (1) alone may be polymerized, or the cyanate ester compound may be polymerized together with any other cyanate ester compound other than the cyanate ester compound of formula (1), an epoxy compound, an oxetane resin and/or a polymerizable unsaturated group-having compound or the like, within a range not detracting from the property of the obtained cyanate ester polymer (cured product).

The other cyanate ester compound other than the cyanate ester compound of formula (1) that may added may be any ordinary known one. For example, it includes bisphenol A dicyanate, bisphenol F dicyanate, bisphenol M dicyanate, bisphenol P dicyanate, bisphenol E dicyanate, phenol-novolak-type cyanate, cresol-novolak-type cyanate, dicyclopentadiene-novolak-type cyanate, tetramethylbisphenol F dicyanate, and biphenyl dicyanate, etc. One or more these cyanate ester compounds may be used herein, either singly or as combined.

In the present invention, a known curing catalyst may be used in curing the cyanate ester compound of formula (1). For example, it includes metal salts such as zinc octylate, zinc naphthenate, cobalt naphthenate, copper naphthenate, acetylacetone iron; and active hydroxyl group-having compounds such as phenol, alcohol, and amine, etc.

The epoxy resin that may be combined with the cyanate ester compound of formula (1) may be any ordinary known one. For example, it includes bisphenol A-type epoxy resin, bisphenol F-type epoxy resin, biphenyl-type epoxy resin, phenol-novolak-type epoxy resin, cresol-novolak-type epoxy resin, xylene-novolak-type epoxy resin, triglycidyl isocyanurate, alicyclic epoxy resin, dicyclopentadiene-novolak-type epoxy resin, biphenyl-novolak-type epoxy resin, phenolaralkyl-novolak-type epoxy resin, naphtholaralkyl-novolak-type epoxy resin, etc. One or more these epoxy resins may be used herein, either singly or as combined.

The oxetane resin that may be combined with the cyanate ester compound of formula (1) may be any ordinary known one. For example, it includes oxetane; alkyloxetanes such as 2-methyloxetane, 2,2-dimethyloxetane, 3-methyloxetane, 3,3-dimethyloxetane; and 3-methyl-3-methoxymethyloxetane, 3,3'-di(trifluoromethyl)perfluoxetane, 2-chloromethyloxetane, 3,3-bis(chloromethyl)oxetane, OXT-101 (trade name by Toa Gosei), OXT-121 (trade name by Toa Gosei), etc. One or more these oxetane resins may be used herein, either singly or as combined.

In case where the cyanate ester compound of formula (1) is combined with epoxy resin and/or oxetane resin, a curing agent for an epoxy resin and/or an curing agent for an oxetane resin may be used. As the curing agent for an epoxy resin, usable is any ordinary known one, including, for example, imidazole derivatives such as 2-methylimidazole, 2-ethyl-4-methylimidazole, 2-phenylimidazole, 1-cyanoethyl-2-phenylimidazole, 1-cyanoethyl-2-ethyl-4-methylimidazole, 2-phenyl-4,5-dihydroxymethylimidazole, 2-phenyl-4-methyl-5-hydroxymethylimidazole; amine compounds such as dicyandiamide, benzyldimethylamine, 4-methyl-N,N-dimethylbenzylamine; and phosphine-type or phosphonium-type phosphorus compounds. As the curing agent for an oxetane resin, usable is any known cationic polymerization initiator. For example, its commercial products are SAN-AID SI60L (aromatic sulfonium salt), SAN-AID SI-80L (aromatic sulfonium salt), SAN-AID SI100L (aromatic sulfonium salt) (by Sanshin Chemical Industry), CI-2064 (by Nippon Soda), IRGACURE 261 ((g-cyclopentadienyl) (g-cumenyl) iron (1+) hexafluorophosphate (1−)) (by Ciba Specialty Chemicals), Adekaoptomer SP-170, Adekaoptomer SP-150 (by Asahi Denka), CYRACURE UVI-6990 (a mixture of triarylsulfonium hexafluoro-phosphate salts) (by UCC), etc. The cationic polymerization initiator may be used also as the curing agent for an epoxy resin. One or more of these curing agents may be used herein, either singly or as combined.

The polymerizable unsaturated group-having compound that may be combined with the cyanate ester compound of formula (I) may be any ordinary known one. For example, it includes vinyl compounds such as ethylene, propylene, styrene, divinylbenzene, divinylbiphenyl; mono or polyalcohol (meth)acrylates such as methyl(meth)acrylate, 2-hydroxyethyl(meth)acrylate, 2-hydroxypropyl(meth)acrylate, polypropylene glycol di(meth)acrylate, trimethylolpropane di(meth)acrylate, trimethylolpropane tri(meth)acrylate, pentaerythritol tetra(meth)acrylate, dipentaerythritol hexa(meth)acrylate; epoxy(meth)acrylates such as bisphenol A-type epoxy(meth)acrylate, bisphenol F-type epoxy(meth)acrylate; benzocyclobutene resins, (bis)maleimide resins, etc. One or more these unsaturated group-having compounds may be used herein, either singly or as combined.

In case where the polymerizable unsaturated group-having compound is used, a known polymerization initiator may be used if desired. The polymerization initiator may be any ordinary known one. For example, it includes peroxides such as benzoyl peroxide, p-chlorobenzoyl peroxide, di-t-butyl peroxide, diisopropyl peroxycarbonate, di-2-ethylhexyl peroxycarbonate; and azo compounds such as azobisisobutyronitrile, etc.

Further, if desired, known additives such as thermoplastic resin, inorganic filler, color pigment, defoaming agent, surface improver, flame retardant, UV absorbent, antioxidant, and flow improver, etc., may be added to the above-mentioned cyanate ester compound. The inorganic filler includes, for example, silicas such as natural silica, fused silica, and amorphous silica; and white carbon, titanium white, aerosil, alumina, talc, natural mica, synthetic mica, kaolin, clay, aluminium hydroxide, barium sulfate, E-glass, A-glass, NE-glass, C-glass, L-glass, D-glass, S-glass, and M-glass G20, etc.

Thus obtained, the cyanate ester polymer is useful for various applications for electric insulating materials, resist resins, semiconductor sealing resins, adhesives for printed circuit boards, built-up laminate materials, resins for fiber-reinforced plastics, sealing resins for liquid-crystal display panels, color filter resins for liquid crystals, paints, various coating agents, adhesives, etc.

The cyanate ester polymer of the present invention is obtained by thermal polymerization (curing) of the above-mentioned cyanate ester compound. When the polymerization temperature is too low, then the polymerization could not go on, but when too high, the polymer may be degraded; and therefore, it is preferably within a range of from 80° C. to 350° C., more preferably from 150° C. to 300° C.

The present invention also provides a prepreg formed by impregnating a substrate with a cyanate ester compound represented by the general formula (1); and a laminate produced by laminating a plurality of those prepregs and integrally shaping them under heat and compression.

In the above prepreg, the above-mentioned curing catalyst may be added to the cyanate ester compound of formula (1). In case where the cyanate ester compound of formula (1) is combined with any other cyanate ester compound other than the cyanate ester compound of formula (1), an epoxy compound, an oxetane resin and/or a polymerizable unsaturated group-having compound or the like, the above-mentioned curing catalyst and curing agent may be added thereto.

As the substrate, usable are glass substrates such as glass cloth, glass nonwoven fabric; paper substrates such as kraft paper, linter paper; and synthetic fiber substrates such as aramide nonwoven fabric, aramide woven fabric. The raw materials for the glass cloth include E glass, D glass, S glass, T glass, and quartz glass, etc. One or more these substrates may be used either singly or as combined.

In case where a plurality of the above-mentioned prepregs are laminated to produce a laminate, the lamination method is not specifically defined, including a multistage lamination pressing method, a continuous production method under compression, an uncompressed continuous production method. In the laminate pressing method, the above prepreg is set between compressing hot plates according to an ordinary method, then metal foil is disposed on and below it, and this is cured under heat and compression to thereby produce a laminate lined with metal on its both surfaces. In the continuous lamination method under compression, a prepreg continuously wound up around a paper tube and metal foil are used to obtain a laminate. In the uncompressed continuous lamination method, a plurality of substrates continuously fed out are continuously impregnated with the above-mentioned cyanate ester compound or a mixture containing the cyanate ester compound, and then the thus-impregnated substrates are continuously laminated with metal foil and cured to obtain a metal foil-lined laminate.

Thus obtained, the laminates are favorable for electric applications.

EXAMPLES

The present invention is described further specifically with reference to the following Examples, to which, however, the present invention should not be limited.

Example A1

Synthesis of a cyanate ester of 4-biphenylaldehyde-bisphenol compound of (formula (3): abbreviated as BABP-CN)

[Chemical Formula 3]

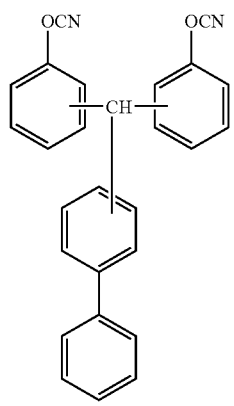

(3)

0.23 mol of 4-biphenylaldehyde-bisphenol compound and 0.51 mol of triethylamine were dissolved in 300 mL of methyl isobutyl ketone (Solution 1). At −10° C., the Solution 1 was dropwise added to a mixed solution of 0.60 mol cyan chloride/methylene chloride solution (200 g) and chloroform (1000 g), taking 1.5 hours. This was stirred for 30 minutes, then a mixed solution of 0.09 mol triethylamine and chloroform (25 g) was dropwise added, and further stirred for 30 minutes to complete the reaction. The obtained liquid was washed with 0.1 mol/L hydrochloric acid (1000 mL) and then with water (1000 mL), and this washing was repeated four times. After dried with sodium sulfate, this was evaporated at 75° C. to obtain a red brown viscous substance. Thereafter, this was dried at 90° C. under reduced pressure to obtain a red brown solid BABP-CN. This was identified by IR and $^{13}$C-NMR.

The compound could dissolve in methyl ethyl ketone in a ratio of at least 30% by weight at 25° C.

Example B1

Production of a Polymer (a Cured Product)

BABP-CN obtained in Example A1 was weighed in an egg-plant type flask in a ratio as in Table 1, melted under heat at 150° C., then degassed via a vacuum pump, and thereafter zinc octylate was added and mixed with stirring for 1 minute. This was cast into a mold formed of a glass plate (120 mm×120 mm×5 mmt), a polyimide film ("Kapton200H" by Toray DuPont), a fluoro rubber-made O ring ("S-100" by Morisei), and cured by heating in an oven at 170° C. for 1 hour and at 230° C. for 9 hours. After cooled, the polyimide film was removed by grinding, thereby obtaining a polymer of the cyanate ester compound.

The characteristics of the obtained cured product were evaluated according to the following methods.

Glass Transition Temperature (Tg):
  Measured through dynamic viscoelasticity analysis (DMA).
  The sample was analyzed at an oscillation frequency of 10 GHz.
Dielectric Constant, Dielectric Loss Tangent:
  Measured according to a cavity resonator perturbation method.
Flame Retardance:
  Tested according to a flame retardance test based on UL94. The sample size was 10 mm×70 mm×1.5 mm.
Thermal Decomposition:
  Determined through TG-DTA (350° C.).

The test results of the physical properties are shown in Table 1.

Comparative Example B1

This is the same as Example B1, in which, however, a bisphenol A dicyanate "Skylex" (a Mitsubishi Gas Chemical's trade name) alone was used in place of BABP-CN.

The test results of the physical properties of the obtained cured product are shown in Table 1.

Comparative Example B2

This is the same as Example B1, in which, however, a mixture of 85% by weight of a bisphenol A dicyanate "Skylex" (a Mitsubishi Gas Chemical's trade name) and 15% by weight of 1-cyanate-2,6-dibromobenzene was used in place of BABP-CN.

The test results of the physical properties of the obtained cured product are shown in Table 1.

Comparative Example B3

This is the same as Example B1, in which, however, a phenol-novolak cyanate "PT30" (Lonza's trade name) was used in place of BABP-CN.

The test results of the physical properties of the obtained cured product are shown in Table 1.

[Table 1]

TABLE 1

Physical Properties of Cured Products

|  |  | Example B1 | Comparative Example B1 | Comparative Example B2 | Comparative Example B3 |
|---|---|---|---|---|---|
| Ingredients (part by weight) | BABP-CN | 100 | — | — | — |
|  | bisphenol A dicyanate | — | 100 | 85 | — |
|  | phenol-novolak cyanate | — | — | — | 100 |
|  | 1-cyanato-2,6-dibromobenzene | — | — | 15 | — |
|  | zinc octylate | 0.05 | 0.05 | 0.05 | 0.05 |
| Characteristics | Tg (° C.: DMA) | 298 | 304 | 267 | 286 |
|  | dielectric constant (10 GHz) | 2.80 | 2.73 | 2.78 | 3.02 |
|  | dielectric loss tangent (10 GHz) | 0.008 | 0.011 | 0.008 | 0.015 |
|  | thermal decomposition resistance (350° C.: TG-DTA) | 2.80% |  | 5.40% |  |
|  | flame retardance (UL94) | V-0 | completely burnt | V-0 | completely burnt |

Bisphenol A dicyanate: "Skylex" by Mitsubishi Gas Chemical
Phenol-novolak cyanate: "PT30" by Lonza As is obvious from Table 1, the polymer of BABP-CN has extremely high flame retardance though a bromine compound is not used with it. In addition, its glass transition temperature is high, and it has excellent heat resistance, and has excellent thermal decomposition resistance. Further, its dielectric loss tangent is low, and it has excellent low dielectric characteristics.

INDUSTRIAL APPLICABILITY

The cyanate ester polymer of the present invention may be used in broad applications for electric insulating materials, resist resins, semiconductor sealing resins, adhesives for printed circuit boards, matrix resins for electric laminates and prepregs, built-up laminate materials, resins for fiber-reinforced plastics, sealing resins for liquid-crystal display panels, color filter resins for liquid crystals, paints, various coating agents, adhesives, etc.

The invention claimed is:

1. A cyanate ester polymer obtained by polymerizing a cyanate ester compound represented by a general formula (1):

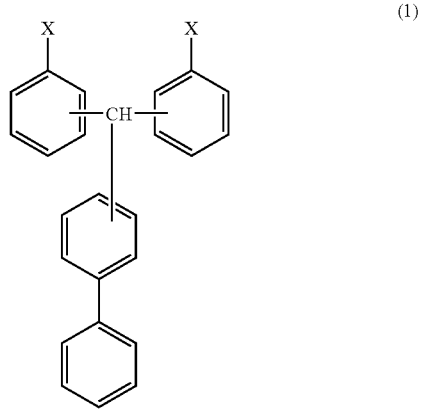

(1)

wherein X represents OCN or OH, and from 80 to 100% by mol of X is OCN, and wherein at least one of the X groups is at a para-position relative to the bridging —CH— group.

2. The cyanate ester polymer of claim 1, wherein both X groups are at a para-position relative to the bridging —CH— group.

3. The cyanate ester polymer of claim 1, wherein the cyanate ester polymer is obtained by thermal polymerization of said cyanate ester compound, at a temperature within a range of from 80° C. to 350° C.

4. The cyanate ester polymer of claim 1, wherein, said cyanate ester compound alone is polymerized.

5. The cyanate ester polymer of claim 1, wherein the cyanate ester polymer is obtained by polymerizing compounds consisting essentially of said cyanate ester compound represented by the general formula (1) and at least one other polymerizable compound selected from the group consisting of another cyanate ester compound other than said cyanate ester compound represented by the general formula (1), an epoxy compound, an oxetane resin and other polymerizable unsaturated group-having compound.

6. A prepreg formed by impregnating a substrate with a cyanate ester compound represented by a general formula (1):

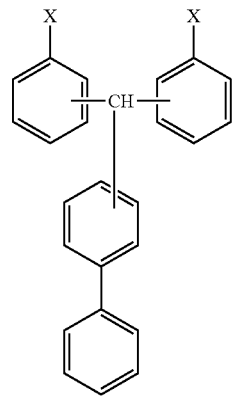

(1)

wherein X represents OCN or OH, and from 80 to 100% by mol of X is OCN, and wherein at least one of the X groups is at a para-position relative to the bridging —CH— group.

7. A laminate produced by laminating a plurality of prepregs of claim 6, and integrally shaping them under heat and compression.

* * * * *